United States Patent
Yang et al.

(10) Patent No.: US 12,451,800 B2
(45) Date of Patent: Oct. 21, 2025

(54) DEADTIME REGULATION DEVICE AND CONVERTER HAVING THE SAME

(71) Applicant: Delta Electronics, Inc., Taoyuan (TW)

(72) Inventors: Zhongwang Yang, Shanghai (CN); Xueliang Chang, Shanghai (CN); Mingjie Shan, Shanghai (CN)

(73) Assignee: Delta Electronics, Inc., Taoyuan (TW)

( * ) Notice: Subject to any disclaimer, the term of this patent is extended or adjusted under 35 U.S.C. 154(b) by 224 days.

(21) Appl. No.: 18/380,115

(22) Filed: Oct. 13, 2023

(65) Prior Publication Data

US 2024/0171066 A1     May 23, 2024

(30) Foreign Application Priority Data

Nov. 21, 2022 (CN) .......................... 202211456326.6
Feb. 3, 2023 (CN) .......................... 202310092089.8

(51) Int. Cl.
*H02M 1/38*     (2007.01)
*H02M 1/00*     (2007.01)
*H02M 3/335*     (2006.01)

(52) U.S. Cl.
CPC ........... *H02M 1/38* (2013.01); *H02M 1/0012* (2021.05); *H02M 1/0054* (2021.05); *H02M 3/33573* (2021.05); *H02M 3/33592* (2013.01)

(58) Field of Classification Search
CPC ........ H02M 1/00; H02M 1/38; H02M 1/0054; H02M 1/385; H02M 3/33573; H02M 3/33592; H02M 3/33571
See application file for complete search history.

(56) References Cited

U.S. PATENT DOCUMENTS 4,641,231 A * 2/1987 Walker ................... H02M 1/38
                                                                                                                 363/58
7,446,513 B2 * 11/2008 Dikken ................... H02M 1/38
                                                                                                                323/271

(Continued)

FOREIGN PATENT DOCUMENTS

CN          102256425 B      7/2014
CN          109600029 B    12/2020

(Continued)

OTHER PUBLICATIONS

Machine Translation TW-201531004-A (Year: 2015).*
Machine Translation WO-9303537-A1 (Year: 1993).*

*Primary Examiner* — Thienvu V Tran
*Assistant Examiner* — Yahveh Comas Torres
(74) *Attorney, Agent, or Firm* — KIRTON McCONKIE; Evan R. Witt

(57) ABSTRACT

A deadtime regulation device and a converter having the same are provided. The converter further includes a first switch, the deadtime regulation device includes a communication bus, an integrated circuit and a controller, and the integrated circuit includes a second switch, a sampling processing circuit and a bus control circuit. The control signals of the first and second switches are complementary, and the control signal of the second switch has a dead time. The sampling processing circuit is for sampling the voltage on the second switch to obtain a duration of the dead time and generating the digital signal accordingly. The controller receives the digital signal from the bus control circuit through the communication bus and adjusts the duration of the dead time according to the received digital signal. The controller performs alignment of the communication timing sequence of the communication bus before transmitting the digital signal.

16 Claims, 12 Drawing Sheets

(56) References Cited

U.S. PATENT DOCUMENTS

| | | | | |
|---|---|---|---|---|
| 7,800,350 B2* | 9/2010 | Pigott | ............... | H02M 3/1588 |
| | | | | 323/271 |
| 7,868,597 B2* | 1/2011 | Dequina | ............ | H02M 3/1588 |
| | | | | 323/284 |
| 8,648,583 B2* | 2/2014 | Brown | ................... | H02M 1/38 |
| | | | | 327/136 |
| 9,166,469 B2* | 10/2015 | Familiant | ............... | H02M 1/38 |
| 9,793,792 B2* | 10/2017 | Forscht | ................. | H02M 1/38 |
| 10,468,974 B2* | 11/2019 | Lee | ................ | H03K 17/04206 |
| 11,996,767 B1* | 5/2024 | Qiu | ........................ | H02J 50/10 |
| 12,142,931 B1* | 11/2024 | Santos Martinez | ..... | H02J 50/12 |
| 2012/0105039 A1* | 5/2012 | Brown | ................... | H02M 1/38 |
| | | | | 323/283 |
| 2014/0320178 A1* | 10/2014 | Hosini | .................. | H03K 3/012 |
| | | | | 327/109 |
| 2015/0263602 A1* | 9/2015 | Drda | ...................... | H02M 1/08 |
| | | | | 363/21.02 |
| 2016/0126822 A1* | 5/2016 | Lyle | ...................... | H03K 17/28 |
| | | | | 307/113 |
| 2020/0363467 A1* | 11/2020 | Chang | ................ | G01R 31/2839 |
| 2023/0023250 A1* | 1/2023 | Karasawa | ............ | H02M 3/158 |

FOREIGN PATENT DOCUMENTS

| | | | | |
|---|---|---|---|---|
| CN | 111953211 B | | 3/2022 | |
| TW | 201531004 A | * | 8/2015 | ........ H02M 3/33592 |
| WO | WO-9303537 A1 | * | 2/1993 | ............. H02M 1/38 |
| WO | WO-2004114509 A1 | * | 12/2004 | ............. H03K 17/28 |

* cited by examiner

DEADTIME REGULATION DEVICE AND CONVERTER HAVING THE SAME

CROSS-REFERENCE TO RELATED APPLICATION

This application claims priority to China Patent Application No. 202211456326.6, filed on Nov. 21, 2022, and China Patent Application No. 202310092089.8, filed on Feb. 3, 2023, the entire contents of which are incorporated herein by reference for all purposes.

FIELD OF THE INVENTION

The present disclosure relates to a deadtime regulation device and a converter having the same, more particularly to a deadtime regulation device and a converter having the same which may control the dead time of switches.

BACKGROUND OF THE INVENTION

In recent years, the issue of energy consumption has been widely concerned by the society, and the subject of energy conservation and environmental protection has received increasing attentions. Therefore, it is important to reduce the loss of power converters to improve the efficiency thereof.

For the half-bridge DC-DC power converter, since both the power device and the printed circuit board have certain parasitic parameters, they may cause some delay of turning on and turning off the power switch. In addition, peripheral circuits such as driving chips may also bring a certain delay to the driving signal. These delays may easily cause the primary and secondary switches of the half-bridge DC-DC power converter to turn on at the same time, resulting in a shoot-through phenomenon. When the shoot-through phenomenon happens, the power supply is directly grounded to generate a considerable short-circuit current, and the power switch would be damaged due to thermal breakdown. Therefore, to avoid the shoot-through phenomenon of the switch, it is necessary to introduce a dead time into the control signal of the switch.

In addition, in the conventional half-bridge DC-DC converter, diodes are used on the secondary side for recertification. However, the diode has the disadvantage of high forward conduction voltage drop. When the rectification current is large, the conduction loss of the diode cannot be ignored and would affect the overall efficiency of the converter. To address this issue, synchronous rectification technology emerges. The synchronous rectification technology uses MOSFET as synchronous rectification device and takes the advantage of the small on-resistance of MOSFET to greatly reduce the power loss of synchronous rectification device, thereby improving the efficiency of the converter. Nevertheless, since the MOSFET is an active switch, the MOSFET needs to be provided with an appropriate control signal to ensure the normal operation of the converter. The traditional control for the dead time in the control signal has still some difficulties in the application of synchronous rectification technology. If the control for the dead time is not accurate enough, the efficiency of the converter will not be maximized, even the current from the secondary side may flow back to the primary side, which makes the converter unable to work normally.

SUMMARY OF THE INVENTION

The present disclosure provides a deadtime regulation device and a converter having the same, the duration of the dead time in the control signal of the switch of the integrated circuit is obtained through sampling the voltage on the switch, and the digital signal is generated accordingly. Therefore, the duration of the dead time can be controlled and adjusted based on the digital signal, thereby reducing the loss caused by the dead time and improving the efficiency of the converter.

In accordance with an aspect of the present disclosure, a deadtime regulation device applicable for a converter including a first switch is provided. The deadtime regulation device includes a communication bus, an integrated circuit and a controller. The integrated circuit is electrically connected to the communication bus for communication and includes a second switch, a sampling processing circuit and a bus control circuit. A control signal of the second switch and a control signal of the first switch are complementary, and the control signal of the second switch has a dead time. The sampling processing circuit is for sampling a voltage on the second switch to obtain a duration of the dead time and generating a digital signal according to the duration of the dead time. The bus control circuit includes at least one switch and transmits the digital signal to the communication bus by turning on and turning off the at least one switch. The controller is electrically connected to the communication bus for communication. The controller receives the digital signal from the bus control circuit through the communication bus and performs alignment of a communication timing sequence of the communication bus before transmitting the digital signal, and the controller adjusts the duration of the dead time according to the received digital signal.

In accordance with another aspect of the present disclosure, a converter is further provided. The converter includes a positive input terminal, a negative input terminal, a positive output terminal, a negative output terminal, a first switch and a deadtime regulation device. The positive input terminal and the negative input terminal are configured to receive an input signal, and the positive output terminal and the negative output terminal are configured to output an output signal. The first switch is electrically connected to the positive input terminal. The deadtime regulation device includes a communication bus, an integrated circuit and a controller. The integrated circuit is electrically connected to the communication bus for communication and includes a second switch, a sampling processing circuit and a bus control circuit. A control signal of the second switch and a control signal of the first switch are complementary, and the control signal of the second switch has a dead time. The sampling processing circuit is for sampling a voltage on the second switch to obtain a duration of the dead time and generating a digital signal according to the duration of the dead time. The bus control circuit includes at least one switch and transmits the digital signal to the communication bus by turning on and turning off the at least one switch. The controller is electrically connected to the communication bus for communication. The controller receives the digital signal from the bus control circuit through the communication bus and performs alignment of a communication timing sequence of the communication bus before transmitting the digital signal, and the controller adjusts the duration of the dead time according to the received digital signal. The second switch of the integrated circuit is electrically connected to the negative output terminal, and the converter is configured to convert the input signal into the output signal.

The above contents of the present disclosure will become more readily apparent to those ordinarily skilled in the art after reviewing the following detailed description and accompanying drawings, in which:

DETAILED DESCRIPTION OF THE INVENTION

The present disclosure will now be described more specifically with reference to the following embodiments. It is to be noted that the following descriptions of exemplary embodiments of this disclosure are presented herein for purpose of illustration and description only. It is not intended to be exhaustive or to be limited to the precise form disclosed.

Figure 1:
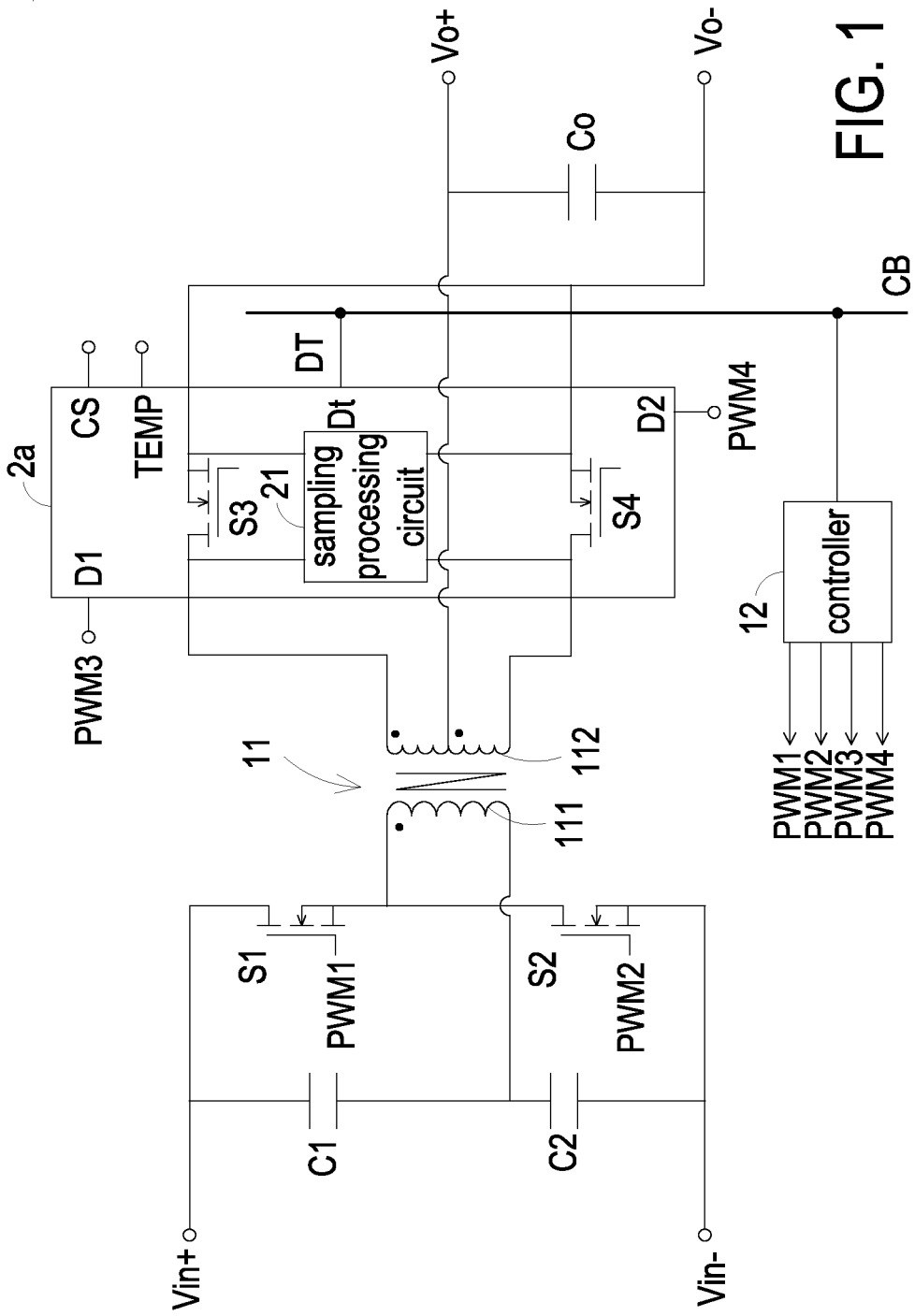
FIG. 1 is a schematic circuit diagram illustrating a converter and a deadtime regulation device thereof according to an embodiment of the present disclosure.

Please refer to FIG. 1. FIG. 1 is a schematic circuit diagram illustrating a converter and a deadtime regulation device thereof according to an embodiment of the present disclosure. As shown in FIG. 1, in this embodiment, a converter 1a may be a half-bridge DC-DC converter. The half-bridge DC-DC converter includes a positive input terminal Vin+, a negative input terminal Vin−, a first primary switch S1, a second primary switch S2, a transformer 11, a deadtime regulation device, a positive output terminal Vo+, and a negative output terminal Vo−. The deadtime regulation device includes an integrated circuit 2a, a communication bus CB and a controller 12. The positive input terminal Vin+ and the negative input terminal Vin− are configured to receive an input signal, the positive output terminal Vo+ and the negative output terminal Vo− are configured to output an output signal, and the converter 1a is configured to convert the input signal into the output signal. The first primary switch S1 and the second primary switch S2 are electrically connected in series between the positive input terminal Vin+ and the negative input terminal Vin−. And the first primary switch S1 and the second primary switch S2 are electrically connected to the positive input terminal Vin+ and the negative input terminal Vin− respectively. The transformer 11 includes a primary winding 111 and a secondary winding 112, and a first terminal of the primary winding 111 is electrically connected to a junction node between the first primary switch S1 and the second primary switch S2. The transformer 11 is for example but not limited to an isolated transformer. In an embodiment, the converter 1a further includes input capacitors C1 and C2. The input capacitors C1 and C2 are electrically connected in series between the positive input terminal Vin+ and the negative input terminal Vin−. A capacitor bridge arm formed by the input capacitors C1 and C2 is connected in parallel to a switch bridge arm formed by the first primary switch S1 and the second primary switch S2. A second terminal of the primary winding 111 of the transformer 11 is electrically connected to a junction node between the input capacitors C1 and C2. In an embodiment, the converter 1a further includes an output capacitor Co. The output capacitor Co is electrically connected between the positive output terminal Vo+ and the negative output terminal Vo−.

Figure 2:
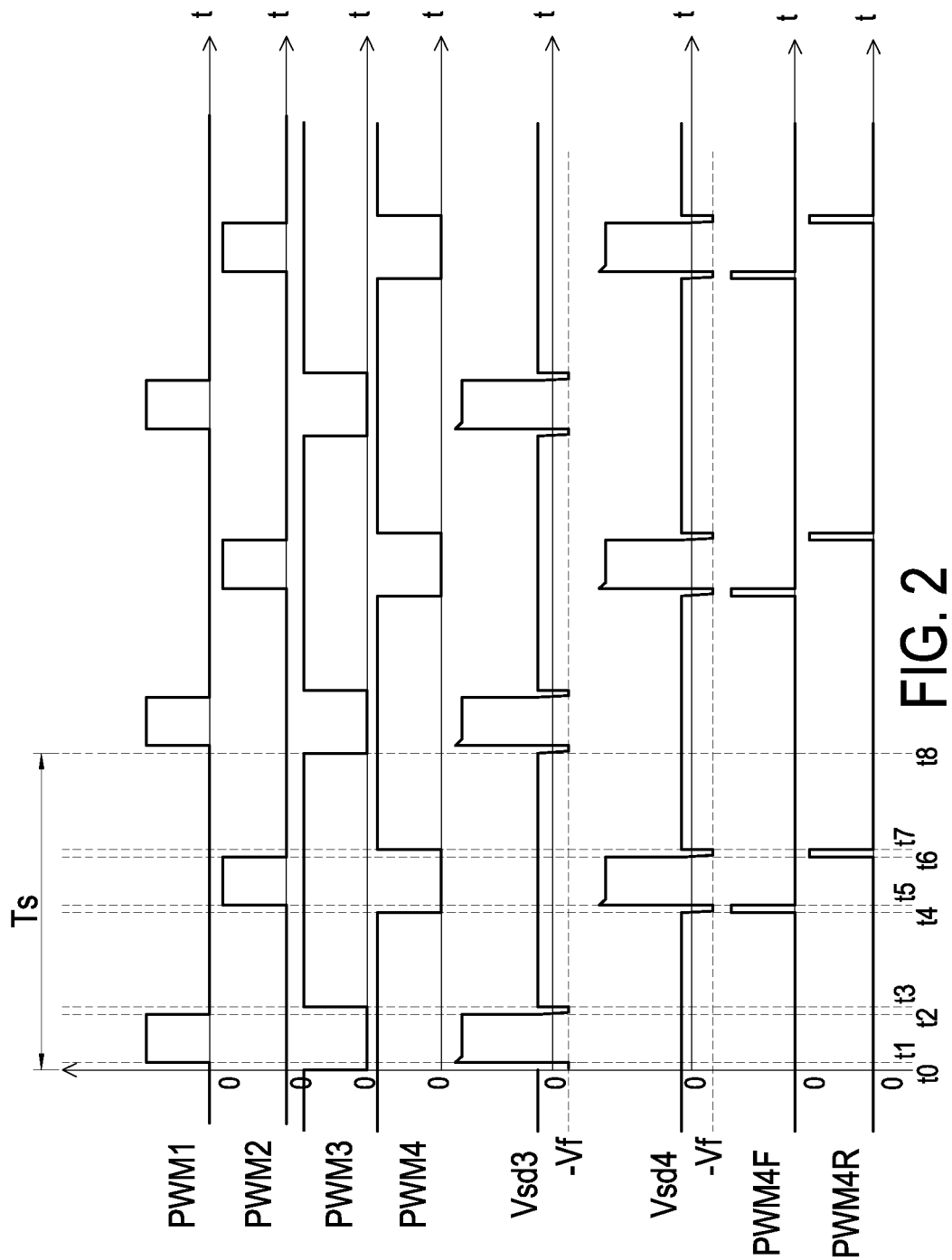
FIG. 2 is a schematic timing waveform diagram illustrating associated voltage signals and PWM signals in the converter of FIG. 1.

In the deadtime regulation device, the integrated circuit 2a and the controller 12 are respectively electrically connected to the communication bus CB and they are in communication with the communication bus CB. The integrated circuit 2a includes a first secondary switch S3, a second secondary switch S4 and a sampling processing circuit 21. The integrated circuit 2a is integrated in one chip so that the impact of the noise on the sampling precision of the sampling processing circuit 21 may be greatly reduced. The first secondary switch S3 and the second secondary switch S4 are configured for secondary-side synchronous rectification. The first secondary switch S3 is electrically connected between a first terminal of the secondary winding 112 and the negative output terminal Vo−, and a second terminal of the secondary winding 112 is electrically connected to the positive output terminal Vo+. The second secondary switch S4 is electrically connected between a third terminal of the secondary winding 112 and the negative output terminal Vo−. Moreover, as shown in FIG. 2, a control signal PWM3 of the first secondary switch S3 and a control signal PWM1 of the first primary switch S1 are complementary and the control signal PWM3 of the first secondary switch S3 has a first dead time, and a control signal PWM4 of the second secondary switch S4 and a control signal PWM2 of the second primary switch S2 are complementary and the control signal PWM4 of the second secondary switch S4 has a second dead time. The sampling processing circuit 21 samples the voltage on the first secondary switch S3 to obtain the duration of the first dead time of the control signal PWM3 (i.e., the dead time corresponding to the first secondary switch S3), and samples the voltage on the second secondary switch S4 to obtain the duration of the second dead time of the control signal PWM4 (i.e., the dead time corresponding to the second secondary switch S4). According to the duration of the first dead time corresponding to the first secondary switch S3 and the duration of the second dead time corresponding to the second secondary switch S4, the sampling processing circuit 21 generates a digital signal DT. The integrated circuit 2a transmits the digital signal DT to the communication bus CB, and the controller 12 receives the digital signal DT transmitted by the integrated circuit 2a through the communication bus CB. According to the digital signal DT, the controller 12 controls the control signals of the switches of the converter 1a to precisely control and adjust the duration of the first dead time corresponding to the first secondary switch S3 and the duration of the second dead time corresponding to the second secondary switch S4 for reducing the loss caused by the dead time and improving the efficiency of the converter 1a.

The switches of converter 1a are for example but not limited to MOSFETs (metal-oxide-semiconductor field-effect transistors), IGBTs (insulated gate bipolar transistors), SiC (silicon carbide) transistors or GaN (gallium nitride) transistors. In this embodiment, as an example, the switches of the converter 1a are MOSFETs. The drain and source of the first secondary switch S3 are electrically connected to the first terminal of the secondary winding 112 and the negative output terminal Vo– respectively. The drain and source of the second secondary switch S4 are electrically connected to the third terminal of the secondary winding 112 and the negative output terminal Vo– respectively. Correspondingly, the voltage on the first secondary switch S3 and the voltage on the second secondary switch S4 sampled by the sampling processing circuit 21 are the source-drain voltage Vsd3 of the first secondary switch S3 and the source-drain voltage Vsd4 of the second secondary switch S4.

In an embodiment, the integrated circuit 2a has two driving pins D1 and D2. The driving pins D1 and D2 are electrically connected to gates of the first secondary switch S3 and the second secondary switch S4 respectively. The two driving pins D1 and D2 are configured to receive the control signals PWM3 and PWM4 and provide the control signals PWM3 and PWM4 to the first secondary switch S3 and the second secondary switch S4 respectively. In an embodiment, the integrated circuit 2a has two drain pins (not shown), and the drains of the first secondary switch S3 and the second secondary switch S4 are electrically connected to the first and third terminals of the secondary winding 112 through the two drain pins respectively. In an embodiment, the integrated circuit 2a has a digital signal pin Dt electrically connected to the sampling processing circuit 21, and the digital signal pin Dt is configured to output the digital signal DT to the controller 12.

In an embodiment, the sampling processing circuit 21 includes a current sampling circuit (not shown), and the integrated circuit 2a has a current pin CS electrically connected to the current sampling circuit. The current sampling circuit samples the current flowing through the first secondary switch S3 and the current flowing through the second secondary side switch S4 and generates a current signal. The current pin CS is configured to output the current signal. In an embodiment, the sampling processing circuit 21 includes a temperature detection circuit (not shown), and the integrated circuit 2a has a temperature pin TEMP electrically connected to the temperature detection circuit. The temperature detection circuit detects temperatures of the first secondary switch S3 and the secondary switch S4 to generate a temperature signal. The temperature pin TEMP is configured to output the temperature signal.

Figure 3:
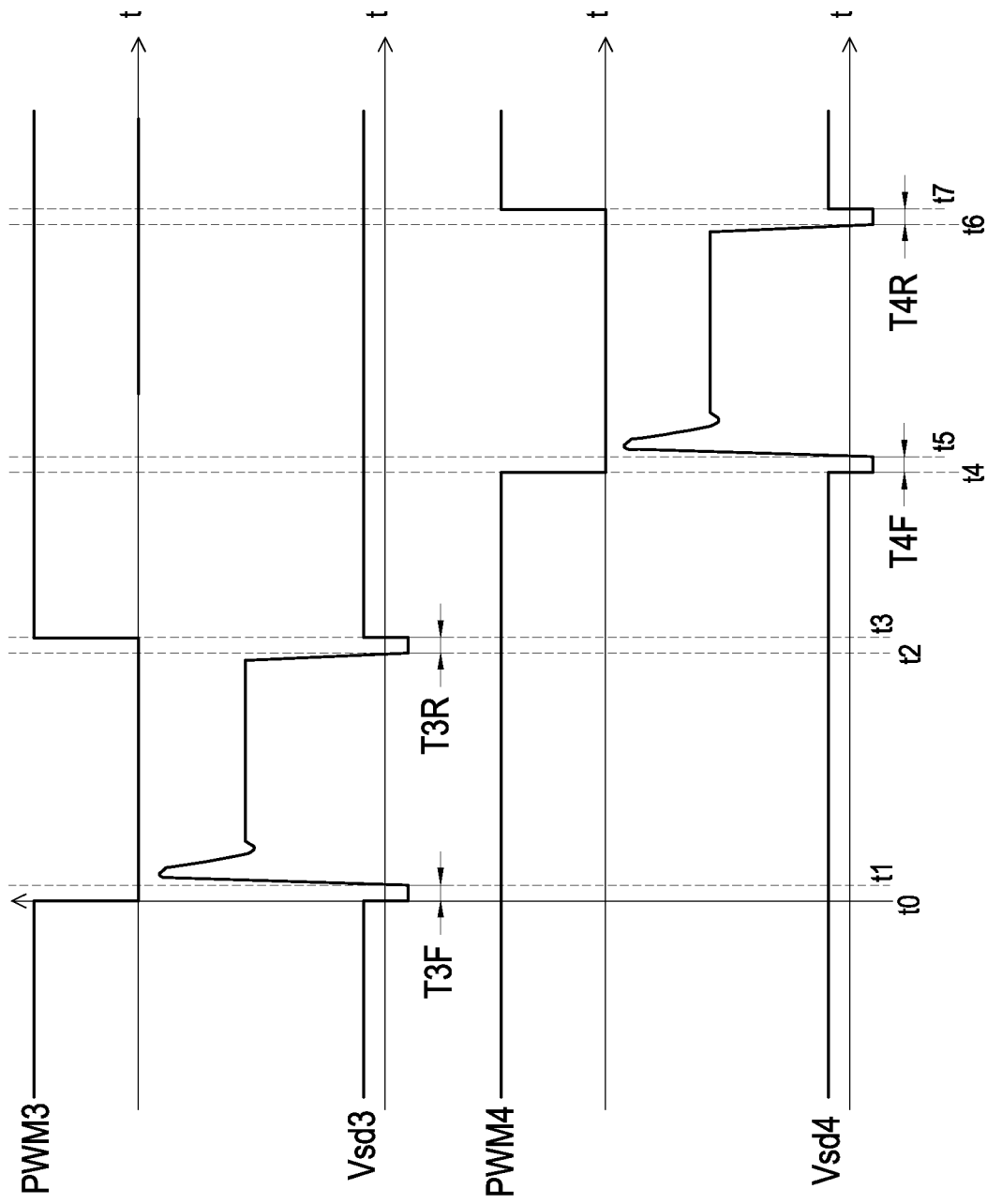
FIG. 3 is a schematic waveform enlarging a part of the waveforms shown in FIG. 2.

FIG. 2 is a schematic timing waveform diagram illustrating associated voltage signals and PWM signals in the converter of FIG. 1. FIG. 3 is a schematic waveform enlarging a part of the waveforms shown in FIG. 2. As shown in FIG. 2, the control signals PWM1 and PWM3 are complementary to each other, and the control signals PWM2 and PWM4 are complementary to each other. The period from time t0 to t8 is one switching cycle Ts. Taking the second secondary switch S4 as an example, when the control signal PWM4 is at high level (from time t0 to t4 as shown in FIG. 2), the rectification current flows through a conduction channel of the second secondary switch S4, and thus the source-drain voltage Vsd4 of the second secondary switch S4 is equal to a voltage drop formed by the rectification current flowing through the on-resistance of the second secondary switch S4. At time t4, that is, when the control signal PWM4 changes from high level to low level, the conduction channel of the second secondary switch S4 turns off. Since the current still flows through the body diode of the second secondary switch S4, the source-drain voltage Vsd4 of the second secondary switch S4 is equal to the forward conduction voltage drop (represented by –Vf) of the body diode. Afterwards, the second secondary switch S4 turns off due to reverse bias. At time t6, the second primary switch S2 is turned off, and the second secondary switch S4 is subjected to forward bias. During the period from time t6 to t7, since the control signal PWM4 is still at low level, the rectification current flows through the body diode of the second secondary switch S4, and the source-drain voltage Vsd4 of the second secondary switch S4 is equal to the forward conduction voltage drop (–Vf) of the body diode. At time t7, the control signal PWM4 changes from low level to high level, and the source-drain voltage Vsd4 of the second secondary switch S4 is equal to the voltage drop formed by the rectification current flowing through the on-resistance of the second secondary switch S4. As shown in FIG. 2 and FIG. 3, in this switching cycle Ts, the period from time t4 to t5 is the dead time T4F at the falling edge of the control signal PWM4, and the period from time t6 to t7 is the dead time T4R at the rising edge of the control signal PWM4. The sampling processing circuit 21 generates two pulse signals PWM4F and PWM4R by sampling the source-drain voltage Vsd4 of the second secondary switch S4. The pulse signal PWM4F reflects the duration of the dead time T4F at the falling edge of the control signal PWM4, and the pulse signal PWM4R reflects the duration of the dead time T4R at the rising edge of the control signal PWM4.

The operation of the first secondary switch S3 is similar to that of the second secondary switch S4, and thus the detailed descriptions thereof are omitted herein. Similarly, the sampling processing circuit 21 generates two pulse signals PWM3F and PWM3R by sampling the source-drain voltage Vsd3 of the first secondary switch S3. The pulse signal PWM3F reflects the duration of the dead time T3F at the falling edge of the control signal PWM3, and the pulse signal PWM3R reflects the duration of the dead time T3R at the rising edge of the control signal PWM3.

Figure 4:
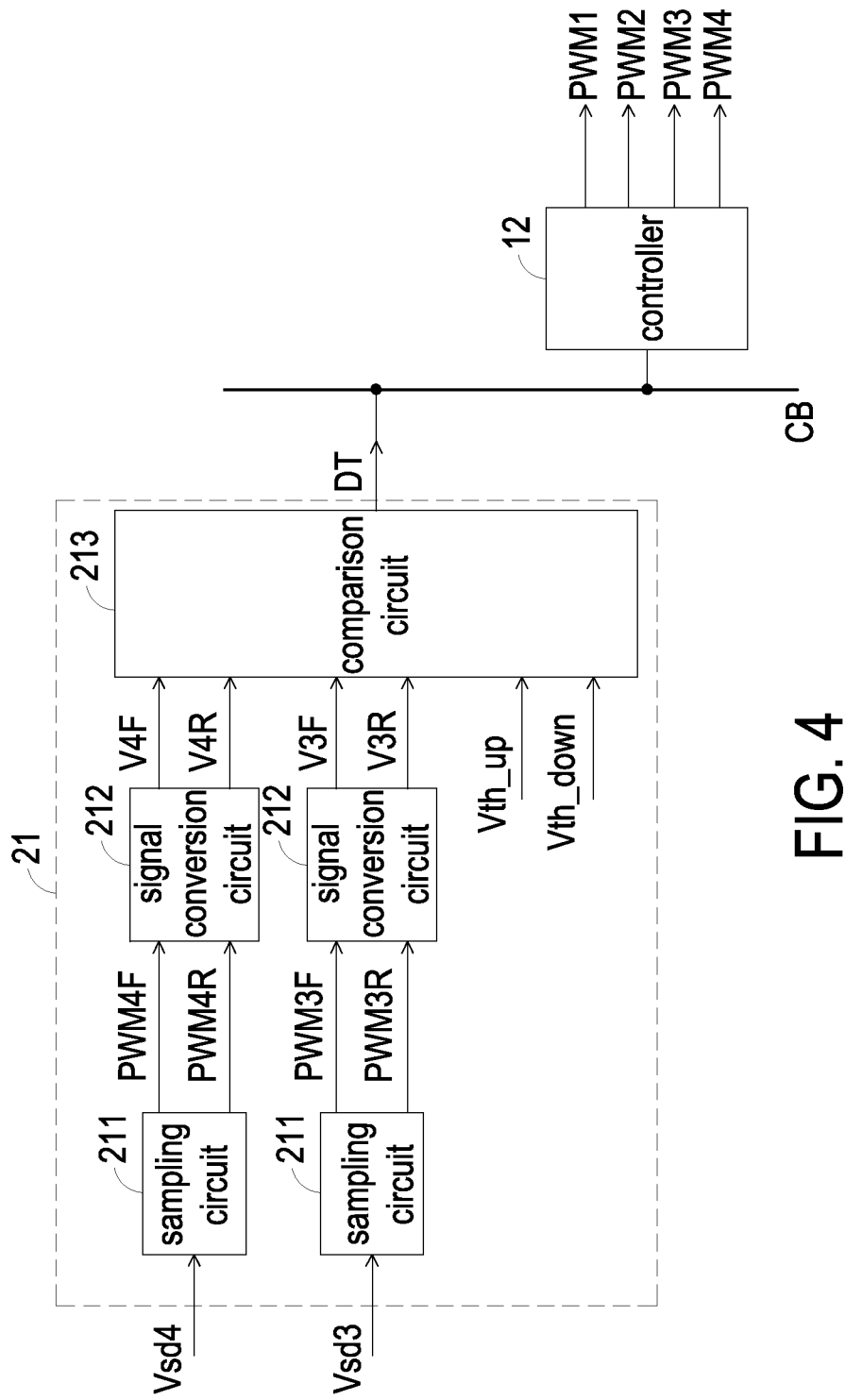
FIG. 4 schematically shows the circuit structure of the sampling processing circuit of FIG. 1.

Please refer to FIG. 4. FIG. 4 schematically shows the circuit structure of the sampling processing circuit of FIG. 1. As shown in FIG. 4, the sampling processing circuit 21 includes a sampling circuit 211, a signal conversion circuit 212 and a comparison circuit 213 electrically connected to each other. The sampling circuit 211 samples the voltage on the switch of the integrated circuit 2a to generate the pulse signal reflecting the duration of the dead time of the control signal of the switch. The signal conversion circuit 212 converts the pulse signal into a voltage signal reflecting the duration of the dead time. The comparison circuit 213 compares the voltage signal with a threshold to generate the digital signal DT. The controller 12 receives the digital signal DT generated by the comparison circuit 213 through the communication bus CB, and the controller 12 adjusts the control signal of the switch of the converter 1a according to the digital signal DT, thereby adjusting the duration of the dead time.

In this embodiment, the sampling processing circuit 21 includes two sampling circuits 211 and two signal conversion circuits 212. In the sampling circuit 211 and signal conversion circuit 212 corresponding to the first secondary switch S3, the sampling circuit 211 samples the source-drain voltage Vsd3 of the first secondary switch S3 to generate two pulse signals PWM3F and PWM3R, and the conversion circuit 212 converts the two pulse signals PWM3F and PWM3R into voltage signals V3F and V3R respectively and provides the voltage signals V3F and V3R to the comparison circuit 213. Similarly, in the sampling circuit 211 and signal conversion circuit 212 corresponding to the second secondary switch S4, the sampling circuit 211 samples the source-drain voltage Vsd4 of the second secondary switch S4 to generate two pulse signals PWM4F and PWM4R, and the signal conversion circuit 212 converts the two pulse signals PWM4F and PWM4R into voltage signals V4F and V4R respectively and provides the voltage signals V4F and V4R to the comparison circuit 213. The voltage signals V3F, V3R, V4F and V4R reflects the duration of the dead times T3F, T3R, T4F and T4R, respectively. In fact, the number of the sampling circuit 211 and the signal conversion circuit 212 is not limited and may correspond to the number of the switches of the integrated circuit 2a. Alternatively, regardless of the number of the switches, the sampling and signal conversion may be realized by the same sampling circuit 211 and the same signal conversion circuit 212.

In addition, in this embodiment, the signal conversion circuit 212 is an integrator circuit which converts the pulse signal into the voltage signal through integrating operation. The magnitude of the voltage signal is proportional to the duration of the dead time. For example, the larger the voltage signal is, the longer the duration of the dead time is. On the contrary, the less the voltage signal is, the shorter the duration of the dead time is. Nevertheless, the implementation of the signal conversion circuit 212 is not limited thereto and can be any circuit capable of converting the pulse signal into the voltage signal reflecting the duration of the dead time.

The comparison circuit 213 receives all the voltage signals V3F, V3R, V4F, and V4R, compares each voltage signal with an upper threshold Vth_up and a lower threshold Vth_down, and generates the digital signal DT according to all comparison results. The controller 12 of the converter 1a controls the control signals PWM1, PWM2, PWM3, and PWM4 of all the switches according to the digital signal DT so as to adjust the duration of each dead time.

Figure 5A:
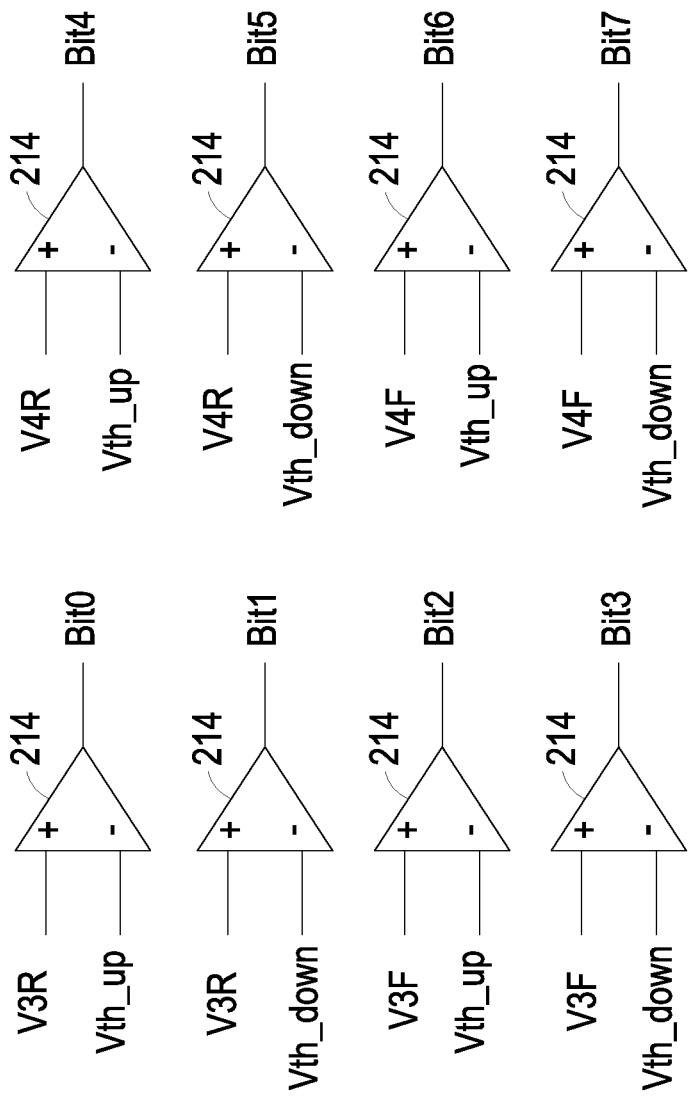
FIGS. 5A and 5B schematically show the operating principle of the comparison circuit of FIG. 4.
Figure 5B:
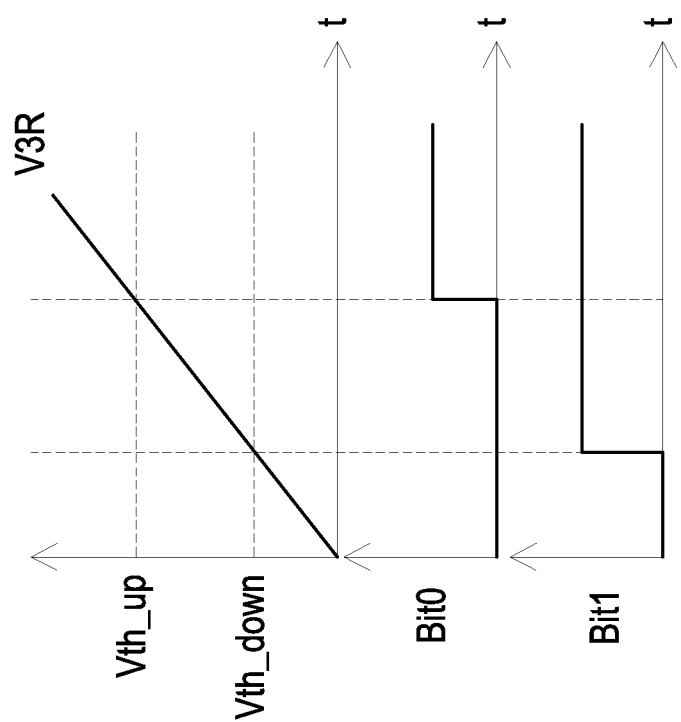

Please refer to FIGS. 5A and 5B. FIGS. 5A and 5B schematically show the operating principle of the comparison circuit of FIG. 4, in which every bit of the digital signal DT is shown. As shown in FIG. 5A, the comparison circuit 213 includes a comparator 214 and a register 215. The comparator 214 is configured to compare the voltage signal with the threshold and generate a deadtime regulating command according to the comparison result. The deadtime regulating command is stored in the register 215, and the digital signal DT generated by the comparison circuit 213 includes all the deadtime regulating commands in the register 215.

In this embodiment, the comparison circuit 213 includes eight comparators 214 and an eight-bit register 215. Each comparator 214 compares the corresponding voltage signal (V3F, V3R, V4F or V4R) with the corresponding threshold (Vth_up or Vth_down) to generate the deadtime regulating command, which is stored in the corresponding bit (Bit0, Bit1, Bit2, Bit3, Bit4, Bit5, Bit6 or Bit7) in the register 215. The corresponding voltage signal, threshold, and bit of each of the eight comparators 214 are shown in FIG. 5A. Accordingly, in the register 215, the deadtime regulating command (Bit0, Bit1) represented by the bits Bit0 and Bit1 corresponds to the dead time T3R at the rising edge of the control signal PWM3, the deadtime regulating command (Bit2, Bit3) represented by the bits Bit2 and Bit3 corresponds to the dead time T3F at the falling edge of the control signal PWM3, the deadtime regulating command (Bit4, Bit5) represented by the bits Bit4 and Bit5 corresponds to the dead time T4R at the rising edge of the control signal PWM4, and the deadtime regulating command (Bit6, Bit7) represented by the bits Bit6 and Bit7 corresponds to the dead time T4F at the falling edge of the control signal PWM4. All the bits (i.e., all the deadtime regulating commands) in the register 215 are combined as the digital signal DT.

Based on the digital signal DT, the controller 12 adjusts the duration of each dead time by controlling the control signal of each switch. Since the adjustment manners for the respective duration of different dead times are similar, the dead time T3R at the rising edge of the control signal PWM3 is exemplified herein. As shown in FIG. 5B, Table 1 and Table 2, the upper threshold Vth_up is greater than the lower threshold Vth_down. When the corresponding voltage signal V3R is less than the lower threshold Vth_down, the bits Bit0 and Bit1 are both 0, the corresponding deadtime regulating command is (0, 0), and the controller 12 increases the duration of the dead time T3R accordingly. When the voltage signal V3R is between the lower threshold Vth_down and the upper threshold Vth_up, the bit Bit0 is 0 and the bit Bit1 is 1, and the corresponding deadtime regulating command is (0, 1). Under this circumstance, the controller 12 does not adjust the duration of the dead time T3R, that is, the current duration of the dead time T3R is maintained. When the voltage signal V3R is greater than the upper threshold Vth_up, the bits Bit0 and Bit1 are both 1, the corresponding deadtime regulating command is (1, 1), and the controller 12 decreases the duration of the dead time T3R accordingly.

TABLE 1

| the magnitude of the voltage signal | Bit 0 | Bit 1 |
| --- | --- | --- |
| V3R < Vth_down | 0 | 0 |
| Vth_down ≤ V3R ≤ Vth_up | 0 | 1 |
| V3R > Vth_up | 1 | 1 |

TABLE 2

| deadtime regulating command | the action executed by the controller of the converter |
| --- | --- |
| (0, 0) | increasing the duration of the dead time |
| (0, 1) | maintaining the current duration of the dead time |
| (1, 1) | decreasing the duration of the dead time |

Figure 6:
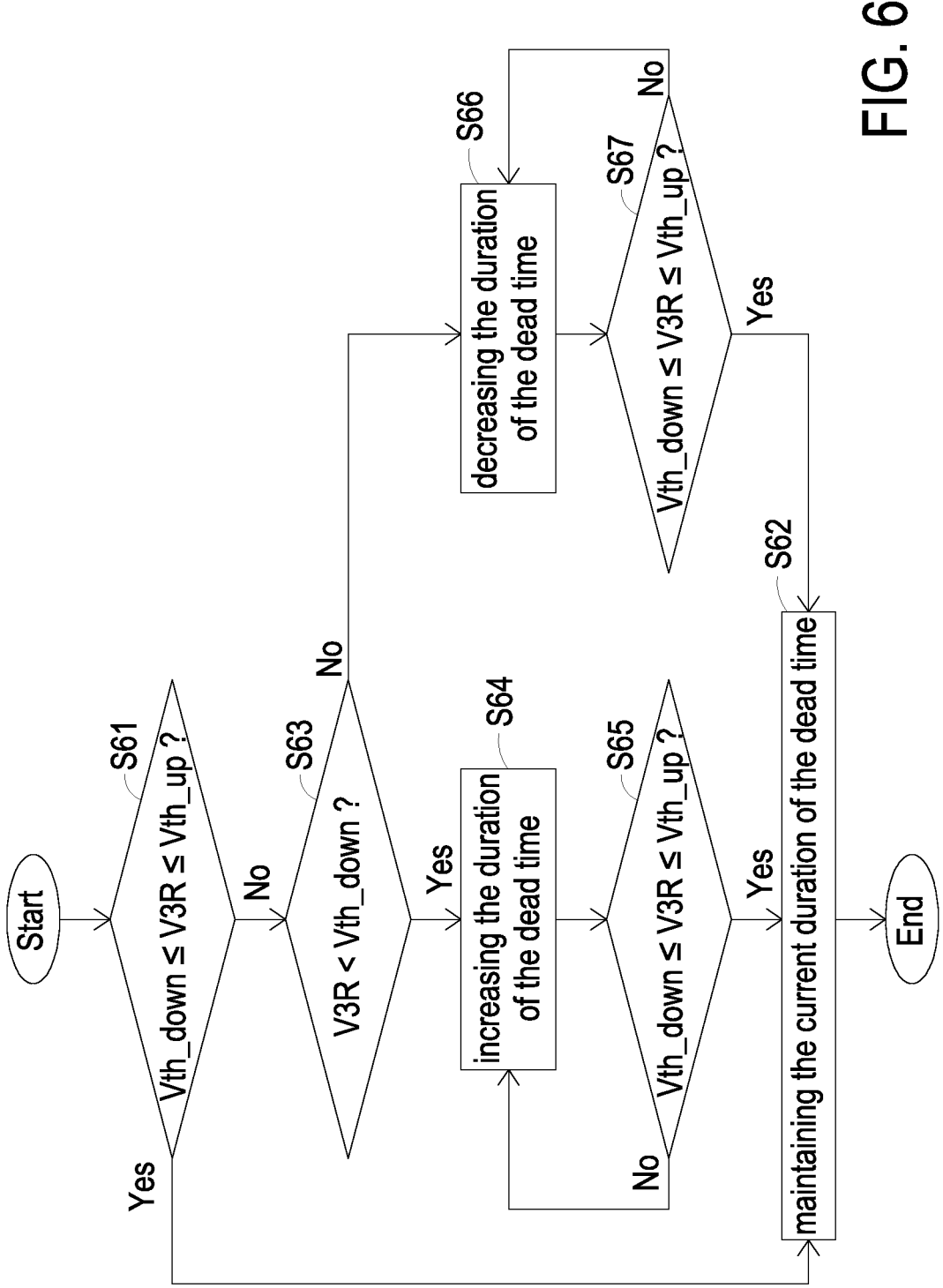
FIG. 6 is a schematic flow chart of the deadtime regulation device of FIG. 1 adjusting the duration of the dead time based on the voltage signal.

The corresponding adjustment process is exemplified in FIG. 6, in which the dead time T3R at the rising edge of the control signal PWM3 is taken as an example. First, it is determined whether the corresponding voltage signal V3R is between the lower threshold Vth_down and the upper threshold Vth_up (step S61). If the determination result is 'Yes', that is, the voltage signal V3R is between the lower threshold Vth_down and the upper threshold Vth_up, the current duration of the dead time T3R is maintained (step S62). If the determination result is 'No', that is, the voltage signal V3R is less than the lower threshold Vth_down or greater than the upper threshold Vth_up, it is further determined whether the voltage signal V3R is less than the lower threshold Vth_down (step S63).

If the determination result of step S63 is 'Yes', that is, the voltage signal V3R is less than the lower threshold Vth_down, and the duration of the dead time T3R is increased by the controller (step S64). Afterwards, it is determined whether the voltage signal V3R is between the lower threshold Vth_down and the upper threshold Vth_up (step S65). If the determination result of step S65 is 'Yes', the current duration of the dead time T3R is maintained (step S62). If the determination result of step S65 is 'No', the duration of the dead time T3R continues to increase (step S64). Accordingly, when the voltage signal V3R is less than the lower threshold Vth_down, the dead time T3R would be gradually increased until the voltage signal V3R is between the lower threshold Vth_down and the upper threshold Vth_up.

If the determination result of step S63 is No', that is, the voltage signal V3R is greater than the upper threshold Vth_up, the duration of the dead time T3R is decreased by the controller (step S66). Then, it is determined whether the voltage signal V3R is between the lower threshold Vth_down and the upper threshold Vth_up (step S67). If the determination result of step S67 is 'Yes', the current duration of the dead time T3R is maintained (step S62). If the determination result of step S67 is 'No', the duration of the dead time T3R continues to decrease (step S66). Accordingly, when the voltage signal V3R is greater than the upper threshold Vth_up, the dead time T3R would be gradually decreased until the voltage signal V3R is between the lower threshold Vth_down and the upper threshold Vth_up.

Further, when the duration of the dead time is increased or decreased (steps S64 and S66), each time the adjustment step size is Vstep, which is less than the difference between the lower threshold Vth_down and the upper threshold Vth_up. The magnitude of the adjustment step size Vstep may be determined according to the switching frequency of the converter 1a and the duration of each dead time. Thereby, the precise control and adjustment for the duration of the dead time are realized to reduce the loss caused by the dead time and to improve the efficiency of the converter.

Figure 7:
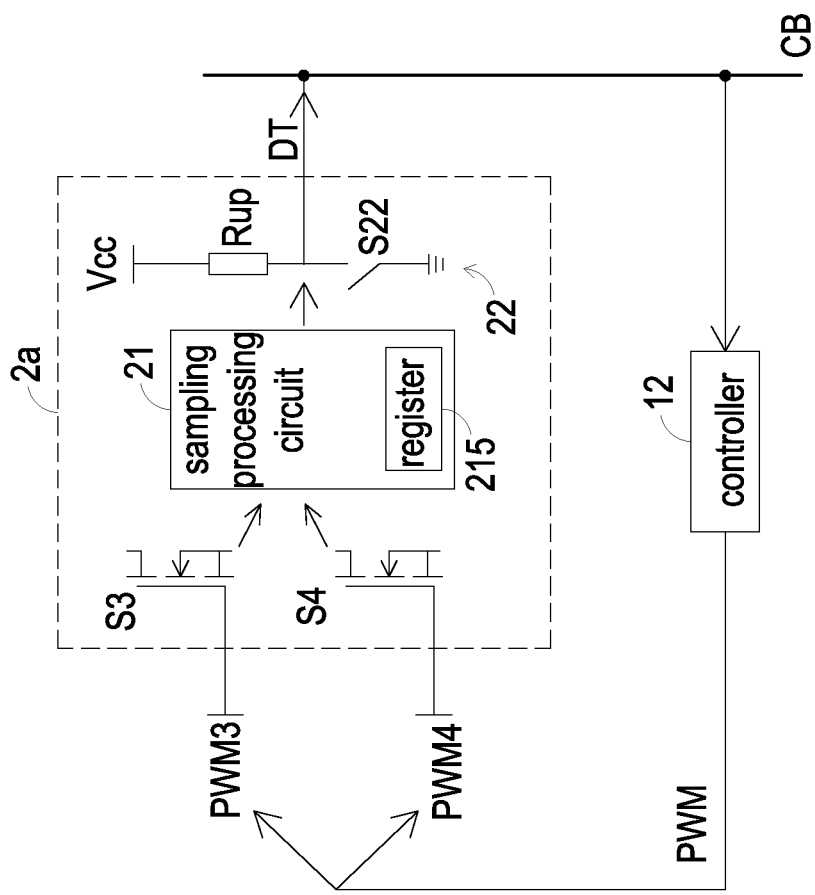
FIG. 7 is schematic circuit diagram illustrating the deadtime regulation device of FIG. 1.

FIG. 7 is schematic circuit diagram illustrating the dead-time regulation device of FIG. 1. As shown in FIG. 7, the integrated circuit 2a further includes a bus control circuit 22. The bus control circuit 22 is electrically connected to the sampling processing circuit 21 and the communication bus CB and includes at least one switch S22. The sampling processing circuit 21 acquires the durations of the dead times through sampling the voltage on the secondary switches and generates the digital signal DT accordingly, and the digital signal DT is stored in the register 215. The bus control circuit 22 transmits the digital signal DT to the communication bus CB by turning on and turning off the switch S22, and the controller 12 receives the digital signal DT through the communication bus CB. According to the digital signal DT, the controller 12 controls the control signals of the switches of the converter 1a to precisely control and adjust the durations of the two dead times corresponding to the first secondary switch S3 and the second secondary switch S4 respectively.

In specific, the bus control circuit 22 further includes a pull-up resistor Rup. Two terminals of the pull-up resistor Rup are electrically connected to the voltage Vcc and a first terminal of the switch S22, and a second terminal of the switch S22 is grounded. When a bit of the digital signal DT is logic 0, the switch S22 turns on, and the bus control circuit 22 outputs a low-level signal (i.e., logic 0) to the communication bus CB. Alternatively, when a bit of the digital signal DT is logic 1, the switch S22 turns off, and the bus control circuit 22 outputs a high-level signal (i.e., logic 1) to the communication bus CB. Accordingly, the bus control circuit 22 transmits every bit of the digital signal DT to the communication bus CB by turning on and turning off the switch S22.

Figure 8A:
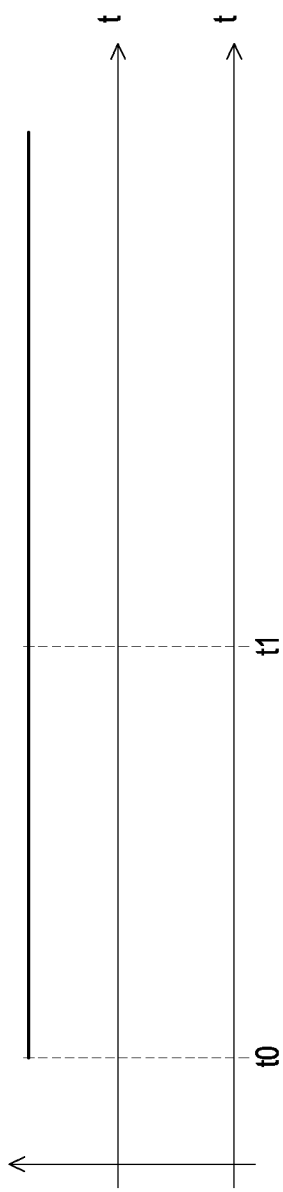
FIGS. 8A and 8B schematically show an implementation of the bus control circuit of FIG. 1 transmitting a bit of the digital signal to the communication bus.
Figure 8B:
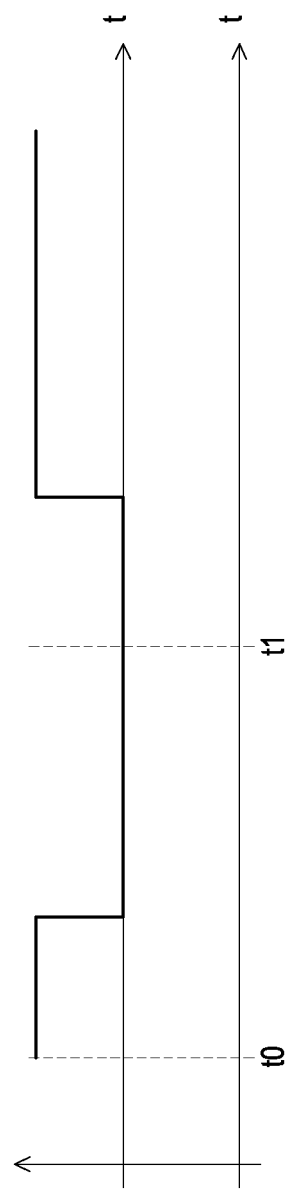

FIGS. 8A and 8B schematically show an implementation of the bus control circuit of FIG. 1 transmitting a bit of the digital signal to the communication bus. The transmitted bits shown in FIG. 8A and FIG. 8B are 1 and 0 respectively, and in FIGS. 8A and 8B, the waveform depicted by solid lines represents the signal outputted by the bus control circuit 22, and the waveform depicted by dashed lines represents the control to the communication bus CB by the controller 12. As shown in FIGS. 8A and 8B, at time t0, the controller 12 pulls down the signal in the communication bus CB to perform alignment of the communication timing sequence and to notify the integrated circuit 2a that communication is ready. Then, the bus control circuit 22 of the integrated circuit 2a transmits a high-level or low-level signal (representing the bit being 1 or 0) to the communication bus CB. Afterwards, at time t1, the control 12 reads the signal transmitted by the bus control circuit 22 in the communication bus CB to obtain the value of the corresponding bit. In another embodiment, the controller 12 may pull up the signal in the communication bus CB to perform alignment of the communication timing sequence.

Figure 9:
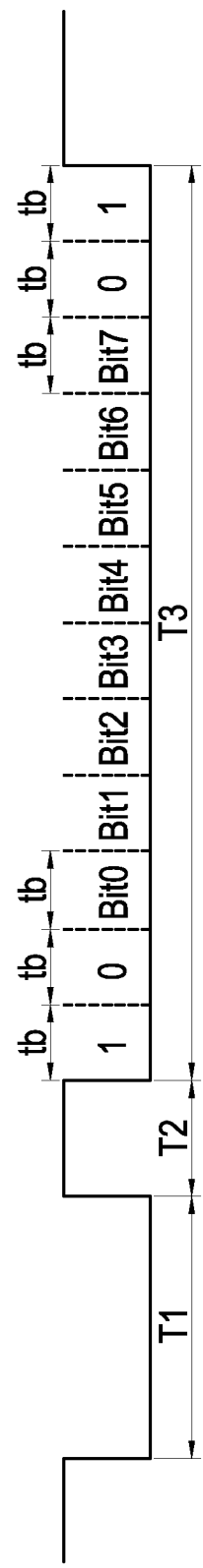
FIG. 9 schematically shows the communication timing sequence of the bus control circuit of FIG. 1 transmitting the digital signal one time.

FIG. 9 schematically shows the communication timing sequence of the bus control circuit of FIG. 1 transmitting the digital signal one time. As shown in FIG. 9, during the time period T1, the controller 12 pulls down the signal in the communication bus CB to low level to perform alignment of the communication timing sequence and to notify the integrated circuit 2a that communication is ready. During the time period T2, the controller 12 pulls up the signal in the communication bus CB from low level to high level to introduce a delay. During the time period T3, the bus control circuit 22 firstly outputs a header check code, then outputs all the bits of the digital signal DT in sequence, and finally outputs a tail check code. In this embodiment, the header check code includes two bits of 1 and 0, and the tail check code includes two bits of 0 and 1, but practical applications are not limited thereto. After receiving the header check code, digital signal DT, and tail check code through the communication bus CB, firstly, the controller 12 needs to check the header and tail check codes. If the check codes are correct, the controller 12 determines that the received digital signal DT is valid and adjusts the duration of the dead time according to the received digital signal DT. Otherwise, if the check codes are incorrect, the controller 12 determines that the received digital signal DT is invalid and maintains the current duration of the dead time. In FIG. 9, tb represents the required time length for transmitting one bit.

In an embodiment, the controller 12 may pull up the signal in the communication bus CB to high level to perform alignment of the communication timing sequence during the time period T1, and may pull down the signal in the communication bus CB from high level to low level to introduce a delay correspondingly, which is not limited to the implementation described above. In an embodiment, the controller 12 may communicate with the communication bus CB and the bus control circuit 22 with a fixed frequency to receive the digital signal DT.

Figure 10A:
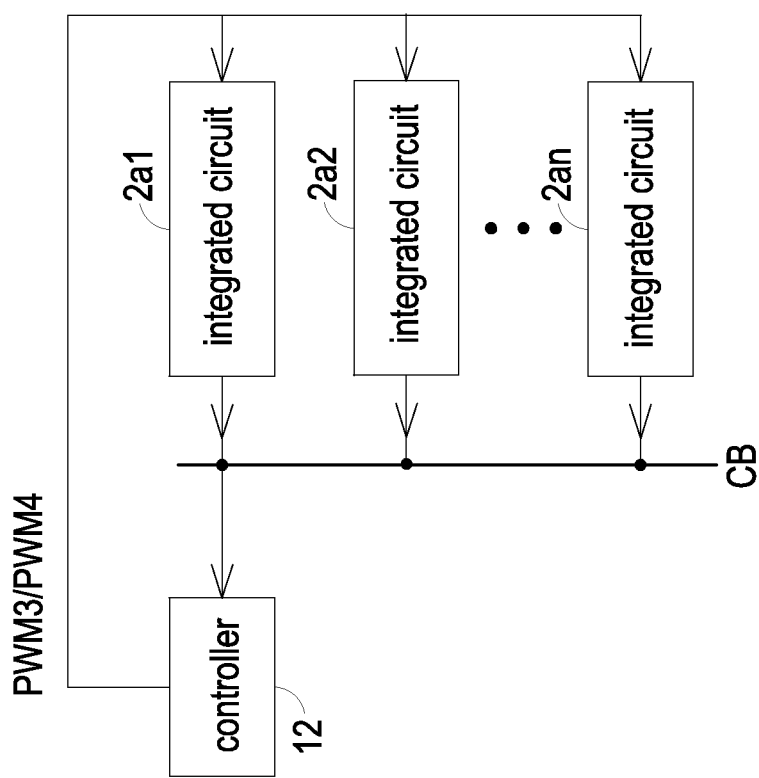
FIGS. 10A and 10B schematically show the implementation of the deadtime regulation device including a plurality of integrated circuits electrically connected in parallel.
Figure 10B:
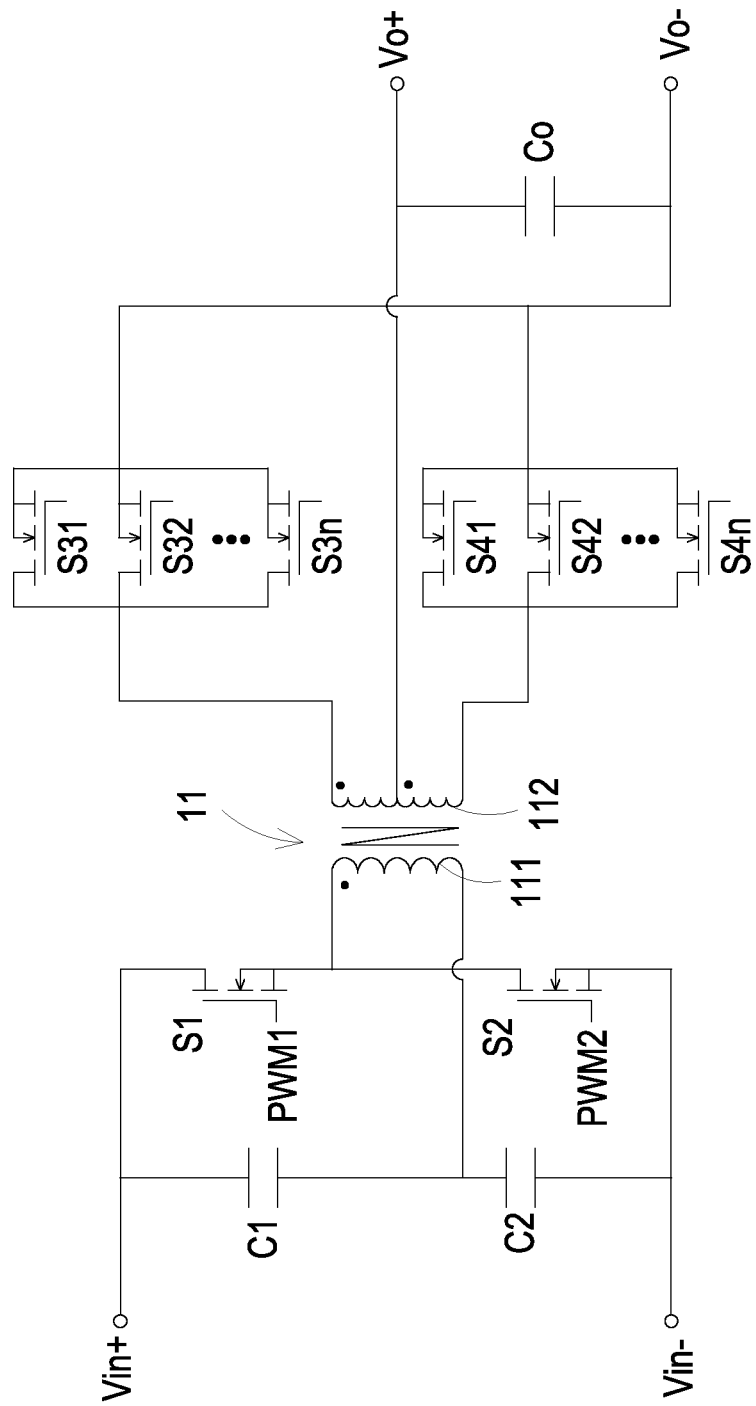

In addition, in an embodiment, to increase the power level of the converter, multiple integrated circuits may be electrically connected in parallel to achieve higher output power. As shown in FIG. 10A, the deadtime regulation device includes n integrated circuits, such as integrated circuits 2a1, 2a2, ..., 2an, electrically connected in parallel, and n is an integer greater than 1. Each integrated circuit is electrically connected to the communication bus CB and may be in communication with the controller 12 through the communication bus CB. In an embodiment, all the integrated circuits may communicate with the controller 12 at the same time. FIG. 10B exemplifies the connection relations between the secondary switches in the case that the deadtime regulation device includes multiple integrated circuits. As shown in FIG. 10B, all the first secondary switches S31, S32, ..., S3n are electrically connected in parallel, and all the second secondary switches S41, S42, ..., S4n are electrically connected in parallel. In FIG. 10B, in order to make the figure concise, the complete integrated circuits 2a1, 2a2, ..., 2an are not shown. In fact, the secondary switches S31 and S41 are disposed in the integrated circuit 2a1, the secondary switches S32 and S42 are disposed in the integrated circuit 2a2, and the secondary switches S3n and S4n are disposed in the integrated circuit 2an. The control signals of all the first secondary switches S31, S32, ..., S3n electrically connected in parallel are the same, and the control signals of all the second secondary switches S41, S42, ..., S4n electrically connected in parallel are the same.

When the controller 12 receives all the digital signals DT transmitted by the integrated circuits 2a1, 2a2, ..., 2an, the controller 12 performs an AND logic operation on the values of the same bit in all the digital signals DT, and controls the durations of the dead times in all the integrated circuits synchronously according to the operation result. Taking the dead time (T3R) at the rising edge of the control signal (PWM3) of the first secondary switch as an example, the corresponding deadtime regulating command is (Bit0, Bit1). When the (Bit0, Bit1) in all the digital signals DT received by the controller 12 includes three pairs of binary value, i.e., (1, 1), (0, 1), and (0, 0), the controller 12 performs the AND logic operation on all the bits Bit0 and obtains an operation result of 0, and the controller 12 performs the AND logic operation on all the bits Bit1 and obtains an operation result of 0. Accordingly, based on the situation that (Bit0, Bit1) is (0, 0), the controller 12 adjusts the durations of the dead times at the rising edge of the control signals of the first secondary switches of all the integrated circuits in the similar way (i.e., increasing the dead times, as shown in Table 2). Therefore, the controller 12 performs the same adjustment on the dead times of the secondary switches which are electrically connected in parallel, thereby simplifying the control and effectively saving the resources required for adjusting the duration of the dead time. In this embodiment, the specific manner of generating and transmitting the digital signal DT by each integrated circuit is the same as that described above, and thus the detailed descriptions thereof are omitted herein.

Moreover, taking the dead time (T3R) at the rising edge of the control signal (PWM3) of the first secondary switch as an example and referring to Table 2. When the (Bit0, Bit1) in all the digital signals DT received by the controller 12 includes two pairs of binary value, i.e., (1, 1) and (0, 1), the result of AND logic operation is (0, 1), and the controller 12 maintains the current duration of the dead time. When the (Bit0, Bit1) in all the digital signals DT received by the controller 12 includes only one pair of binary value (1, 1), the result of AND logic operation is (1, 1), and the controller 12 decreases the duration of the dead time. Consequently, regarding any deadtime regulating command in the digital signal DT and the corresponding dead time, the operation result of the AND logic operation performed on every bit by the controller 12 reflects the duration (status) of the shortest dead time in all the integrated circuits.

In addition, in the converter, if the switches which are not included in the integrated circuit are regarded as first switches and the switches of the integrated circuit are regarded as second switches, the number of the first switches and the number of the second switches are not limited to two as exemplified in the aforementioned embodiments actually and may be any positive integer. For example, the number of the first switch and the number of the second switch may be one or more, and the specific topology of the converter is not limited to the above embodiments. When the converter includes a plurality of first switches, the integrated circuit may include a plurality of second switches corresponding to the plurality of first switches respectively. The control signals of the corresponding first and second switches are complementary to each other, and the control signal of the second switch has a dead time. The sampling processing circuit samples the voltage on each second switch to obtain the duration of the dead time corresponding to the second switch, and generates a digital signal according to the durations of the dead times corresponding to all the second switches. The digital signal is used to adjust the durations of the dead times corresponding to all the second switches. The specific adjustment manner is similar to the above description, and thus the detailed descriptions thereof are omitted herein.

Based on the above, in the present disclosure, a deadtime regulation device and a converter including the deadtime regulation device are provided. The duration of the dead time in the control signal of the switch of the integrated circuit is obtained through sampling the voltage on the switch, and the digital signal is generated accordingly. Therefore, the duration of the dead time can be accurately controlled and adjusted based on the digital signal, thereby reducing the loss caused by the dead time and improving the efficiency of the converter.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A deadtime regulation device applicable for a converter comprising a first switch, the deadtime regulation device comprising:
  a communication bus;
  an integrated circuit, electrically connected to the communication bus for communication, and the integrated circuit comprising:
    a second switch, wherein a control signal of the second switch and a control signal of the first switch are complementary and the control signal of the second switch has a dead time;
    a sampling processing circuit for sampling a voltage on the second switch to obtain a duration of the dead time, and generating a digital signal according to the duration of the dead time; and
    a bus control circuit, wherein the bus control circuit comprises at least one switch, and transmits the digital signal to the communication bus by turning on and turning off the at least one switch; and
  a controller electrically connected to the communication bus for communication, wherein the controller receives the digital signal from the bus control circuit through the communication bus and performs alignment of a communication timing sequence of the communication bus before transmitting the digital signal, and the controller adjusts the duration of the dead time according to the received digital signal.

2. The deadtime regulation device according to claim 1, wherein the controller performs the alignment of the communication timing sequence of the communication bus before the communication bus transmits each bit of the digital signal.

3. The deadtime regulation device according to claim 2, wherein before the communication bus transmits each bit of the digital signal, the controller pulls up or pulls down a signal in the communication bus to perform the alignment of the communication timing sequence and to notify the integrated circuit that communication is ready; when the communication begins, the bus control circuit transmits a high-level signal or a low-level signal representing a transmitted bit to the communication bus, and the controller reads the high-level signal or the low-level signal transmitted by the bus control circuit in the communication bus to obtain a value of the transmitted bit.

4. The deadtime regulation device according to claim 1, wherein the bus control circuit further comprises a pull-up resistor, two terminals of the pull-up resistor are electrically connected to a power source and a first terminal of the at least one switch respectively, a second terminal of the at least one switch is grounded, and the bus control circuit transmits each bit of the digital signal to the communication bus by turning on and turning off the at least one switch.

5. The deadtime regulation device according to claim 4, wherein when a bit of the digital signal is logic '0', the at least one switch is turned on, and the bus control circuit outputs a low-level signal to the communication bus; when the bit of the digital signal is logic '1', the at least one switch is turned off, and the bus control circuit output a high-level signal to the communication bus.

6. The deadtime regulation device according to claim 1, wherein in a communication timing sequence of the bus control circuit for transmitting the digital signal to the communication bus, the communication timing sequence of the bus control circuit comprises a first time period, a second time period and a third time period sequentially;
during the first time period, the controller pulls down a signal in the communication bus to low level or pulls up the signal to high level to perform the alignment of the communication timing sequence and to notify the integrated circuit that communication is ready;
during the second time period, the controller pulls up the signal in the communication bus from low level to high level or pulls down the signal from high level to low level to introduce a delay;
during the third time period, the bus control circuit outputs a header check code, outputs all bits of the digital signal in sequence, and outputs a tail check code in turn;
wherein the controller receives the header check code, the digital signal and the tail check code through the communication bus and checks the header check code and the tail check code; if the header check code and the tail check code are correct, the controller determines that the received digital signal is valid and adjusts the duration of the dead time according to the digital signal; and if the header check code and the tail check code are incorrect, the controller determines that the received digital signal is invalid and maintains the duration of the dead time.

7. The deadtime regulation device according to claim 1, wherein the dead time comprises a first dead time at a rising edge of the control signal of the second switch and a second dead time at a falling edge of the control signal of the second switch, and the digital signal comprises a plurality of bits reflecting the duration of the first dead time and the duration of the second dead time.

8. The deadtime regulation device according to claim 7, further comprising a plurality of the integrated circuits, wherein corresponding second switches of the plurality of the integrated circuits are electrically connected in parallel.

9. The deadtime regulation device according to claim 8, wherein when the controller receives a plurality of the digital signals from the plurality of integrated circuits simultaneously, the controller performs an AND logic operation for corresponding bits of the plurality of digital signals; regarding each bit of the digital signal and a duration of the corresponding dead time reflected by the bit, the controller performs the AND logic operation for corresponding bits of the plurality of digital signals, and the controller performs same adjustment to the duration of the corresponding dead time of the control signals of the plurality of second switches according to an operation result.

10. The deadtime regulation device according to claim 9, wherein regarding each bit of the digital signal and a duration of the corresponding dead time reflected by the bit, the operation result of the AND logic operation performed by the controller reflects the shortest one of the durations of the dead times of the control signals of the plurality of second switches.

11. The deadtime regulation device according to claim 8, wherein the plurality of integrated circuits are in communication with the controller through the communication bus simultaneously, and control signals of the plurality of corresponding second switches electrically connected in parallel in the plurality of integrated circuits are the same.

12. The deadtime regulation device according to claim 1, wherein the sampling processing circuit comprises a sampling circuit, a signal conversion circuit and a comparison circuit electrically connected to each other, the sampling circuit samples the voltage on the second switch to generate a pulse signal reflecting the duration of the dead time, the signal conversion circuit converts the pulse signal into a voltage signal reflecting the duration of the dead time, the comparison circuit compares the voltage signal with a threshold to generate the digital signal, and the controller controls the control signals of the first switch and the second switch according to the digital signal to adjust the duration of the dead time.

13. The deadtime regulation device according to claim 12, wherein the threshold comprises an upper threshold and a lower threshold, the upper threshold is greater than the lower threshold; when the voltage signal is less than the lower threshold, the controller increases the duration of the dead time; when the voltage signal is between the lower threshold and the upper threshold, the duration of the dead time is maintained; and when the voltage signal is greater than the upper threshold, the controller decreases the duration of the dead time.

14. The deadtime regulation device according to claim 1, wherein the converter comprises a plurality of the first switches, the integrated circuit comprises a plurality of the second switches corresponding to the plurality of first switches respectively, control signals of the first switch and the second switch corresponding to each other are complementary and the control signal of the second switch has a dead time, the sampling processing circuit samples a voltage on each of the plurality of second switches to obtain a duration of the dead time corresponding to each of the plurality of second switches, the sampling processing circuit generates the digital signal according to the duration of the dead time corresponding to the plurality of second switches, and the controller adjusts the duration of the dead time corresponding to the plurality of second switches according to the digital signal.

15. A converter, comprising:
a positive input terminal, a negative input terminal, a positive output terminal and a negative output terminal, wherein the positive input terminal and the negative input terminal are configured to receive an input signal, and the positive output terminal and the negative output terminal are configured to output an output signal;
a first switch, electrically connected to the positive input terminal; and
a deadtime regulation device, comprising:
a communication bus;
an integrated circuit, electrically connected to the communication bus for communication, and the integrated circuit comprising:
a second switch, wherein a control signal of the second switch and a control signal of the first switch are complementary, and the control signal of the second switch has a dead time;
a sampling processing circuit for sampling a voltage on the second switch to obtain a duration of the dead time, and generating a digital signal according to the duration of the dead time; and
a bus control circuit, wherein the bus control circuit comprises at least one switch, and transmits the digital signal to the communication bus by turning on and turning off the at least one switch; and
a controller electrically connected to the communication bus for communication, wherein the controller receives the digital signal from the bus control circuit through the communication bus and performs alignment of a communication timing sequence of the communication bus before transmitting the digital signal, and the controller adjusts the duration of the dead time according to the received digital signal,
wherein the second switch of the integrated circuit is electrically connected to the negative output terminal, and the converter is configured to convert the input signal into the output signal.

16. The converter according to claim 15, comprising:
two first switches electrically connected in series between the positive input terminal and the negative input terminal, wherein a first one and a second one of the two first switches are electrically connected to the positive input terminal and the negative input terminal respectively;
two input capacitors electrically connected in series between the positive input terminal and the negative input terminal; and
a transformer comprising a primary winding and a secondary winding, wherein a first terminal of the primary winding is electrically connected to a junction node between the two first switches, and a second terminal of the primary winding is electrically connected to a junction node between the two input capacitors,
wherein the integrated circuit comprises two second switches, a first one of the two second switches is electrically connected between a first terminal of the secondary winding and the negative output terminal, a second terminal of the secondary winding is electrically connected to the positive output terminal, a second one of the two second switches is electrically connected between a third terminal of the secondary winding and the negative output terminal, a control signal of the first one of the two second switches and a control signal of the first one of the two first switches are complementary and the control signal of the first one of the two second switches has a first dead time, and a control signal of the second one of the two second switches and a control signal of the second one of the two first switches are complementary and the control signal of the second one of the two second switches has a second dead time,
wherein the sampling processing circuit samples voltages on the two second switches to obtain durations of the first dead time and the second dead time corresponding to the two second switches, the sampling processing circuit generates the digital signal according to the durations of the first dead time and the second dead time corresponding to the two second switches, and the digital signal is used to adjust the durations of the first dead time and the second dead time corresponding to the two second switches.

\* \* \* \* \*